United States Patent [19]

Hornbeck

[11] Patent Number: 5,600,383
[45] Date of Patent: Feb. 4, 1997

[54] MULTI-LEVEL DEFORMABLE MIRROR DEVICE WITH TORSION HINGES PLACED IN A LAYER DIFFERENT FROM THE TORSION BEAM LAYER

[75] Inventor: Larry J. Hornbeck, Van Alstyne, Tex.

[73] Assignee: Texas Instruments Incorporated, Dallas, Tex.

[21] Appl. No.: 474,203

[22] Filed: Jun. 7, 1995

Related U.S. Application Data

[60] Continuation of Ser. No. 792,518, Nov. 13, 1991, abandoned, which is a division of Ser. No. 546,465, Jun. 29, 1990, Pat. No. 5,083,857.

[51] Int. Cl.⁶ .................. H04N 5/74; G02B 26/00
[52] U.S. Cl. ............ 348/771; 348/770; 359/291; 359/295; 437/228
[58] Field of Search ................ 359/223, 224, 359/290, 291, 846, 318, 295; 348/770, 771; 437/228; 156/652; H04N 5/74

[56] References Cited

U.S. PATENT DOCUMENTS

| | | | |
|---|---|---|---|
| 3,746,911 | 7/1973 | Nathanson et al. | 315/21 R |
| 3,886,310 | 5/1975 | Gulberg et al. | 359/291 X |
| 4,317,611 | 3/1982 | Petersen | 359/223 X |
| 4,566,935 | 1/1986 | Hornbeck | 156/626 |
| 4,592,628 | 6/1986 | Altman et al. | 359/223 |
| 4,615,595 | 10/1986 | Hornbeck | 359/291 X |
| 4,662,746 | 5/1987 | Hornbeck | 359/223 |
| 4,710,732 | 12/1987 | Hornbeck | 332/7.51 |
| 4,954,789 | 9/1990 | Sampsell | 359/318 |
| 5,018,256 | 5/1991 | Hornbeck | 359/291 X |
| 5,083,857 | 1/1992 | Hornbeck | 359/291 |
| 5,099,353 | 3/1992 | Hornbeck | 359/291 |
| 5,142,405 | 8/1992 | Hornbeck | 359/226 |
| 5,148,157 | 9/1992 | Florence | 359/318 X |
| 5,212,582 | 5/1993 | Nelson | 359/291 X |
| 5,216,537 | 6/1993 | Hornbeck | 359/291 |
| 5,233,456 | 8/1993 | Nelson | 359/846 X |
| 5,289,172 | 2/1994 | Gale, Jr. et al. | 345/108 |
| 5,312,513 | 5/1994 | Florence et al. | 156/652 |

FOREIGN PATENT DOCUMENTS

0332953  3/1989  European Pat. Off. ........ G02B 26/08

Primary Examiner—James J. Groody
Assistant Examiner—Cheryl Cohen
Attorney, Agent, or Firm—Dana L. Burton; Richard L. Donaldson; James C. Kesterson

[57] ABSTRACT

A bistable deformable mirror device (DMD) pixel architecture is disclosed, wherein the torsion hinges are placed in a layer different from the torsion beam layer. This results in pixels which can be scaled to smaller dimensions while at the same time maintaining a large fractional active area, an important consideration for bright, high-density displays such as are used in high-definition television applications.

19 Claims, 7 Drawing Sheets

45° TORSION

FIG. 8a

90° TORSION

FIG. 8b

FLEXURE

FIG. 8c

45° CANTILEVER

FIG. 8d

MULTI-LEVEL DEFORMABLE MIRROR DEVICE WITH TORSION HINGES PLACED IN A LAYER DIFFERENT FROM THE TORSION BEAM LAYER

This application is a Continuation of application Ser. No. 07/792,518, filed Nov. 13, 1991, now abandoned, which is a divisional of Ser. No. 07/546,465, filed on Jun. 29, 1990, now U.S. Pat. No. 5,083,857.

TECHNICAL FIELD OF THE INVENTION

This invention relates to deformable mirror devices and more particularly to such devices where the torsion hinges are constructed in a plane different from the reflective surface.

RELATED APPLICATIONS

All of the following patent applications are cross-referenced to one another and all have been assigned to Texas Instruments Incorporated. These applications have been concurrently filed and are hereby incorporated in this patent application by reference.

| | |
|---|---|
| U.S. Pat. No. 5,083,857 | Multi-Level Deformable Mirror Device |
| U.S. Pat. No. 5,142,405 | Improved Bistable DMD Addressing Circuit and Method |
| U.S. Pat. No. 5,018,256 | Improved Architecture and Process for Integrating DMD with Control Circuit Substrates |
| U.S. Pat. No. 5,280,277, which was a file wrapper continuation of U.S. Appl. Ser. No. 07/546,332, now abandoned | Field Updated Deformable Mirror Device |
| Also referenced herein and incorporated by reference is: | |
| | Spacial Light Modulator and Method, Serial #355,049, filed May 15, 1989; now abandoned. |
| | Spatial Light Modulator and Method, Serial #408,355, filed September 14, 1989; now abandoned. |
| U.S. Pat. No. 4,662,746 | Spatial Light Modulator and Method Dated May 5, 1987; |
| U.S. Pat. No. 4,566,935 | Spatial Light Modulator and Method Dated January 28, 1986; and |
| U.S. Pat. No. 4,615,595 | Frame Addressed Spatial Light Modulator Dated October 7, 1986 |

BACKGROUND OF THE INVENTION

Deformable mirror devices are finding many uses in light deflecting technologies. In operation, the devices are akin to small mirrors which rotate about a fixed axis. The rotation causes light to be deflected under control of the rotation. Thus, in some applications an array of such DMD's are positioned such that as the individual DMD devices, called pixels, are selectively rotated, patterns can be created for various purposes.

The DMD devices are used, typically, in a dark field projection optic arrangement and can be used, for example, in a HDTV application where a large array of pixels are necessary for the desired clarity. These large pixel arrays require close packing of the individual DMD pixels and a high modulation efficiency to maximize brightness as well as low light scattering to maximize contrast.

Light scattering is controlled, in part, by the amount of non-rotatable (dead) surface area exposed to the light. This dead area arises because it is used to provide the torsional hinges which support the rotatable DMD pixels. One such arrangement of such torsional hinges and the construction thereof is shown in U.S. Pat. No. 4,662,746, issued to me on May 5, 1987, which patent is hereby incorporated by reference herein.

Thus, there exists in the art a need for a DMD matrix which couples high density with high modulation efficiency and which has low inherent light scattering.

There is a further need in the art for such a structure which maximizes the light reflective area for a given density of DMD pixels.

There is a further need in the art for a DMD architecture which will support HDTV applications.

SUMMARY OF THE INVENTION

A spatial light modulator device has been constructed with the torsion hinges under the rotatable mirror surface at a location within the substrate, for example, between the address electronics and the surface, such that the "dead" area of the surface is significantly reduced. Using this structure, then, a DMD device can be constructed having several technical advantages. First, this structure achieves lower light scattering (higher contrast), because the light scattering caused by the torsional hinges is eliminated. Another technical advantage of this structure is the fact that the surface area occupied by the rotatable mirror is increased, leading to higher modulation efficiency (higher brightness). A further technical advantage of this invention is the creation of several different configurations of pixel elements, all of which are controllably deflective, and which are on a reflective surface of a substrate with the mechanically linked rotational supports contained in a surface other than the reflective surface.

The multilayered mirror surface and hinge are constructed in several steps by a combination of spin depositing, sputter depositing, coupled with several plasma etching and photolithography steps.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
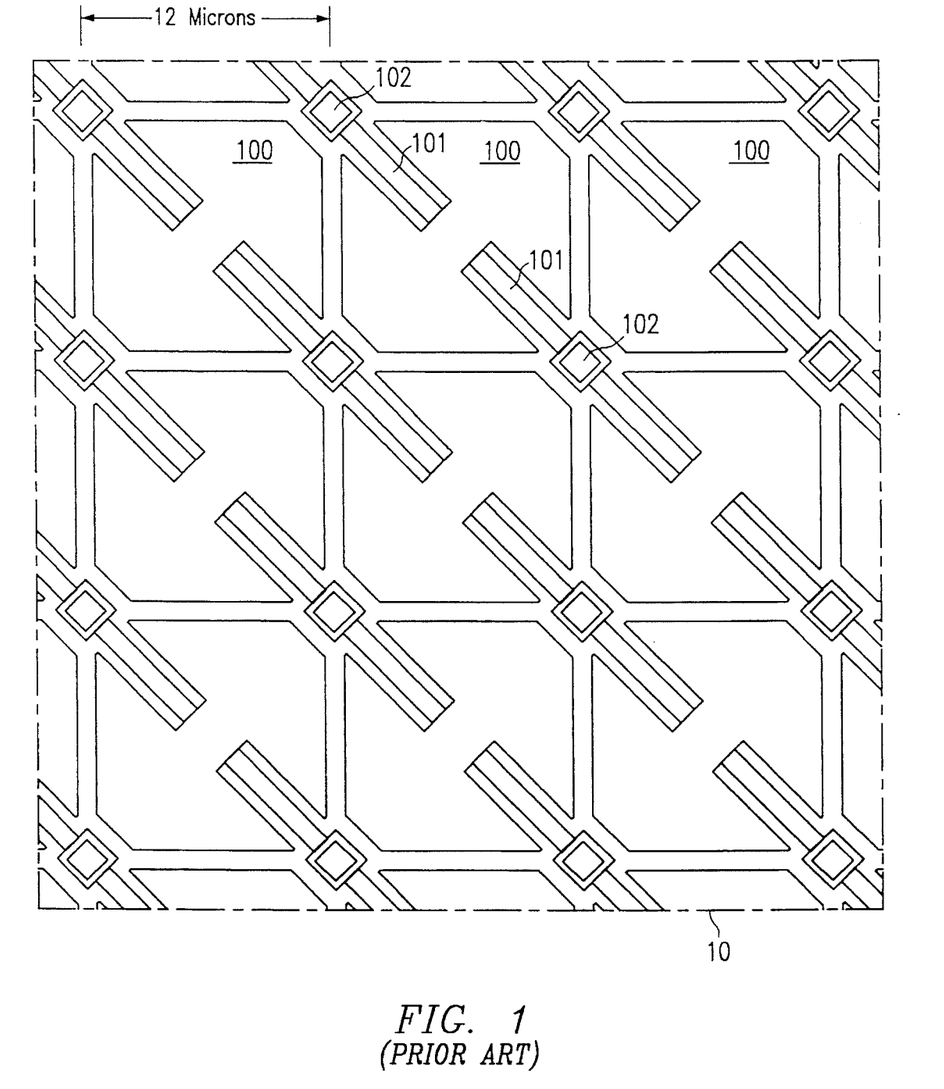
FIG. 1 is an array of DMD pixels having the prior art architecture.

FIG. 1 illustrates a conventional prior art 45-degree bistable torsion beam array 10, with a 12 micron pixel pitch. Each pixel 100 is supported for rotational purposes by hinges 101, supported on the substrate by supports 102.

Figure 2:
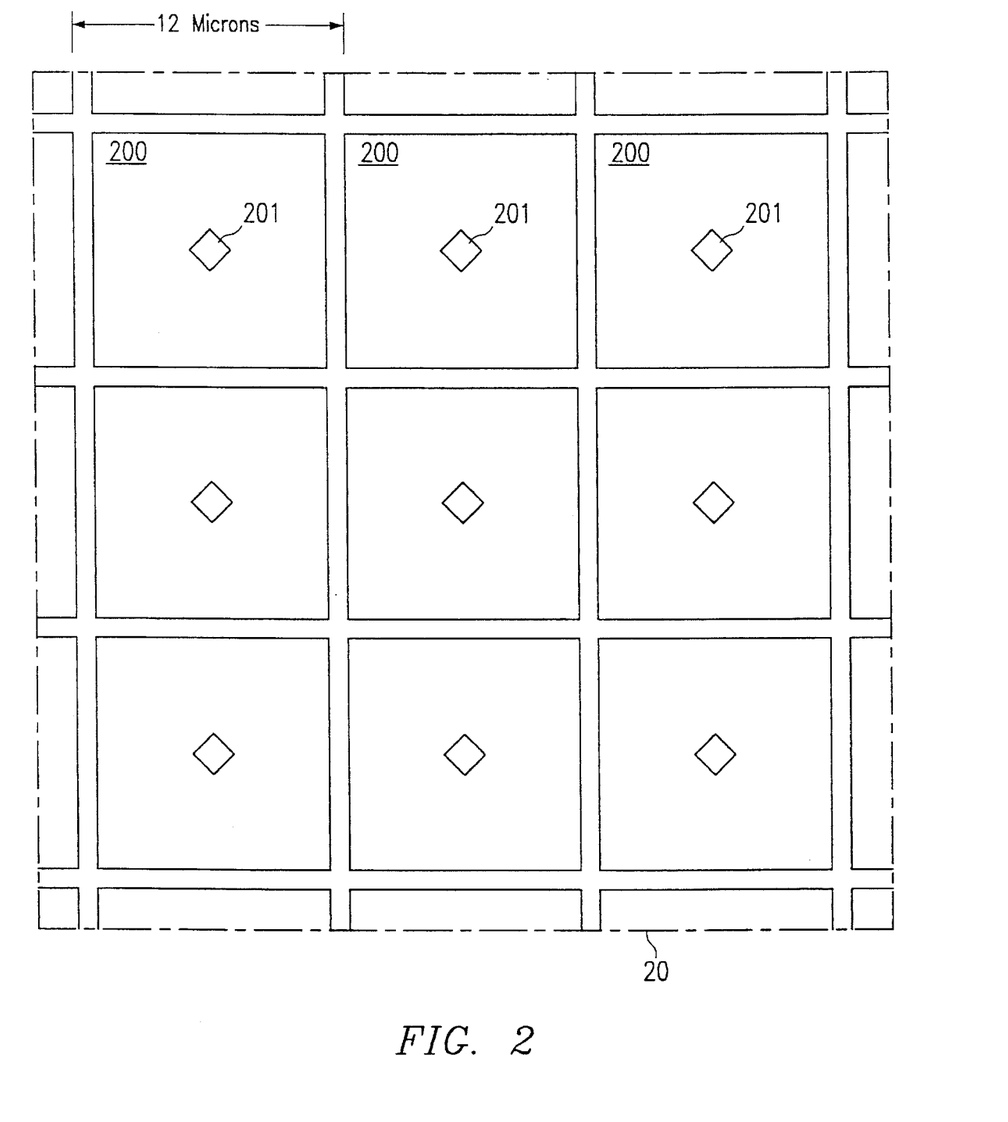
FIG. 2 is an array of DMD pixels having the multi-level hinge architecture.

The prior art arrangement is to be compared with the structure shown in FIG. 2 showing a hidden hinge array 20, also having a 12 micron pitch. When the hidden hinge architecture is viewed from the top, as in FIG. 2, only the square torsion beam reflective surface 200 of each pixel and the beam support post 201 are visible. A comparison of element 100 (FIG. 1) with element 200 (FIG. 2) clearly shows that the hidden hinge provides a greater rotatable reflective surface for a given pixel size.

Figure 3:
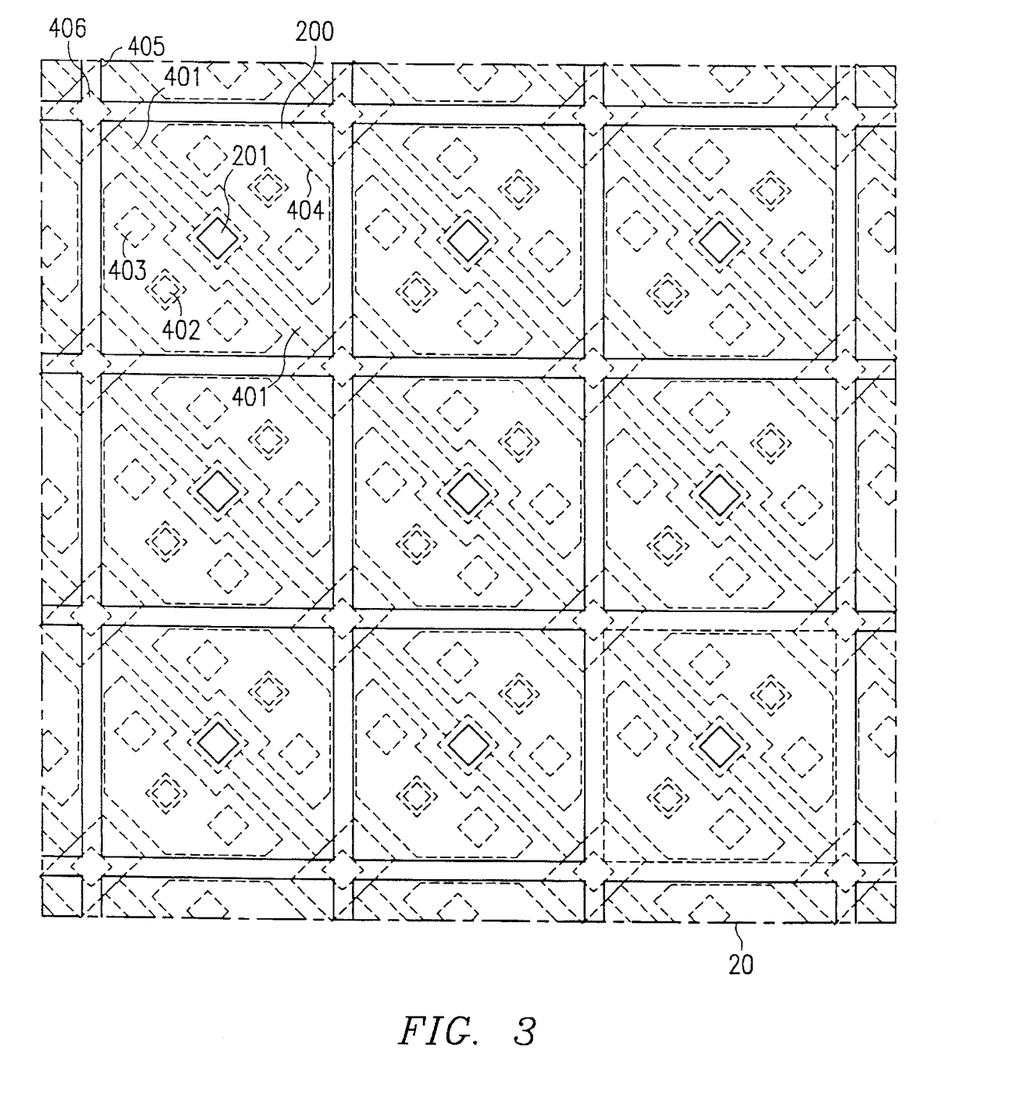
FIG. 3 shows in broken line format the underlying hinge, electrodes and supports for the new architecture.
Figure 4:
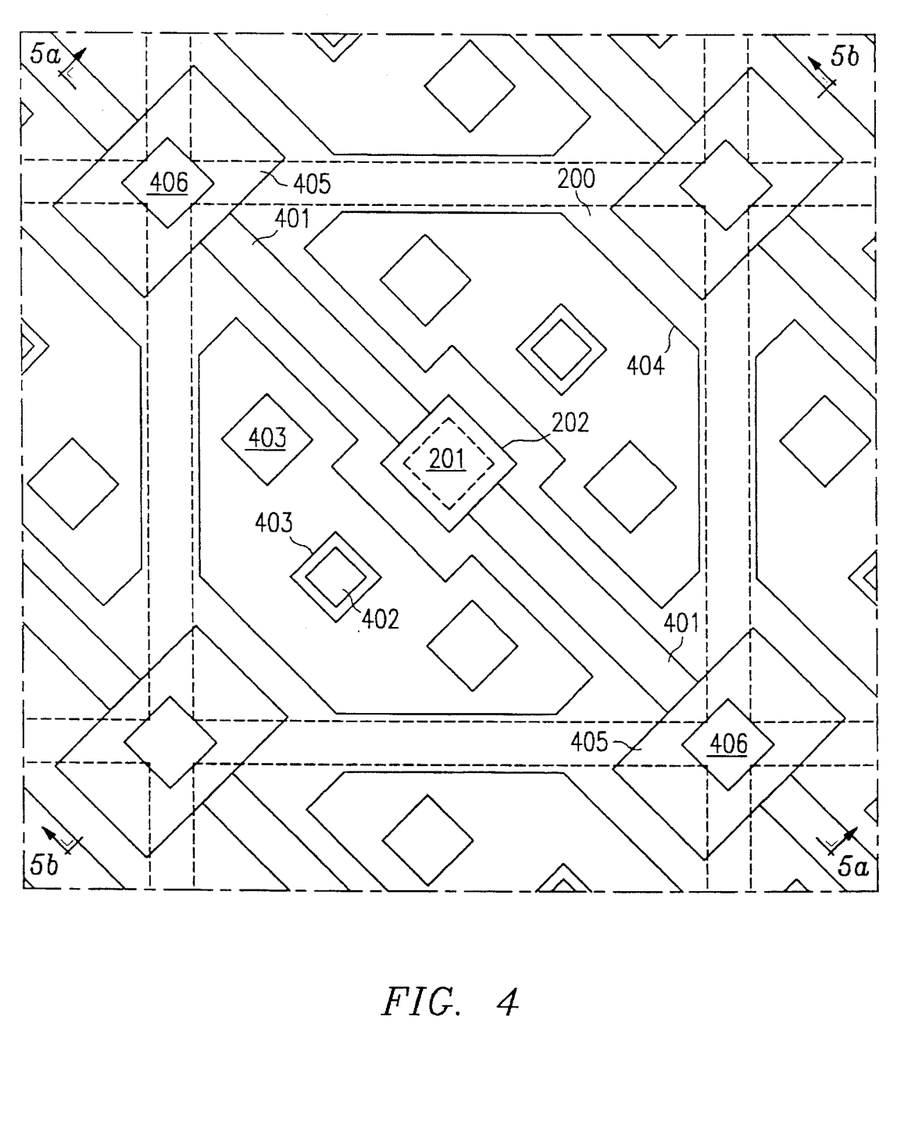
FIG. 4 shows the layout of the hinge, electrodes and support mechanism of the underlying layers.

The underlying hinges, address and landing electrodes are shown as dotted lines in FIG. 3. Beam support post 201 rigidly connects beam 200 to underlying torsion hinge 401. Details of the underlying hinge and electrodes are shown in FIG. 4. Beam support post 201 allows beam 200 to rotate under control of hinges 401 which in turn are connected to posts 406. This allows rotatable surface (beam) 200 to rotate under control of an electrode supported by posts 403. Beam 200 lands in contact with landing electrode 405. Contact 402 extends through the substrate and is in contact with the underlying address electronics. The construction and operation of this device will be discussed hereinafter.

Figure 5A:
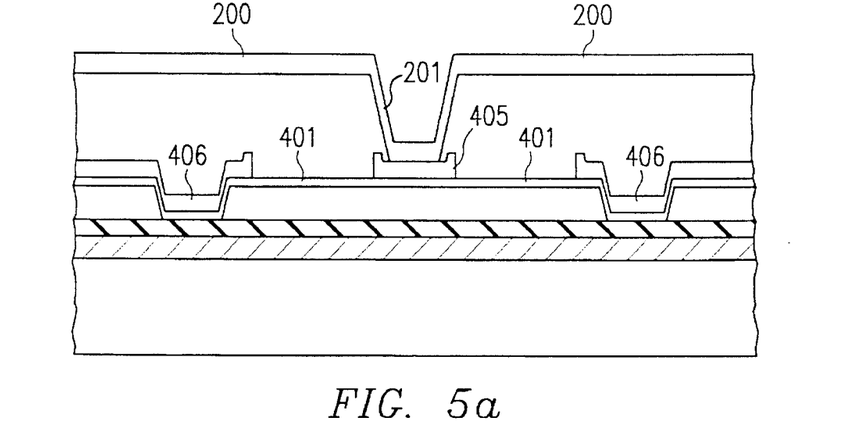
FIGS. 5a and 5b show sectional side views of the multi-layered device taken along section 5a—5a and 5b—5b, of FIG. 4, respectively.
Figure 5B:
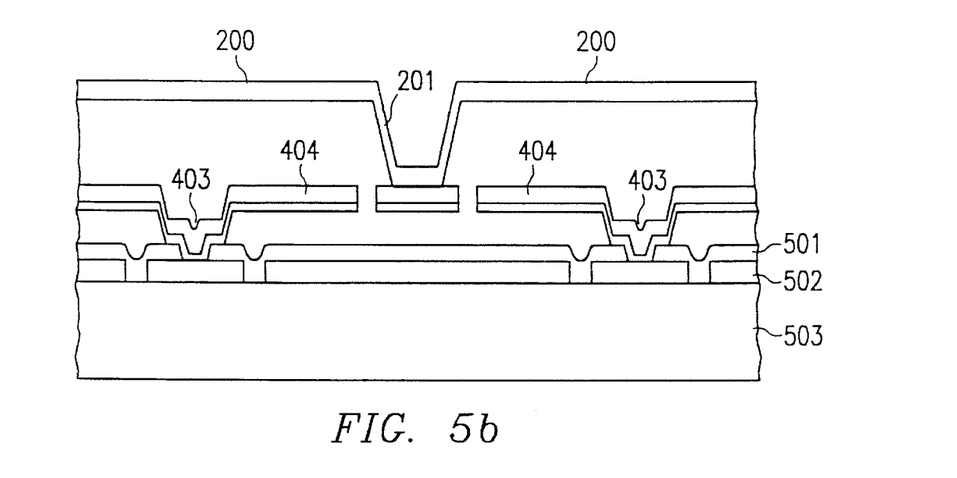

Cross sections along the hinge are shown in FIGS. 5a and 5b. FIG. 5a is a cross-section along the hinge showing hinge support post 406, hinge 401, and beam 200. FIG. 5b is a cross-section taken at right angles to hinge 401 and shows address electrode 404 and electrode support post 403. Also shown are protective oxide layer 501, METAL2 layer 502, and CMOS circuit and substrate layer 503.

Figure 6:
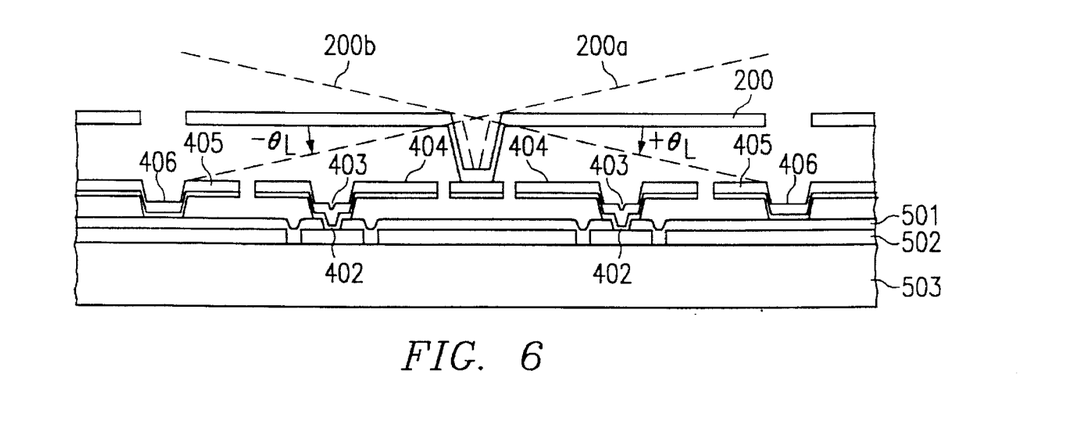
FIG. 6 shows the operation of the beam in two states under control of address electrodes.

FIG. 6 illustrates beam 200 rotation 200a to landing angle $-\theta_L$ and rotation 200b to landing angle $+\theta_L$. Also shown are address electrodes 404 which control the movement (200a, 200b) and landing electrodes 405 positioned at the other end of the see-saw swing of beam 200. The manner of controlling the rotational movement of beam 200 is detailed in aforementioned patent application entitled IMPROVED BISTABLE DMD ADDRESSING CIRCUIT AND METHOD.

Digressing momentarily, by placing hinge 401, as shown in FIG. 4, between the address electrodes 404, less space is available for the address electrodes. However, this has a negligible effect on the address voltage requirement. The area that is lost to the address electrodes has a near zero moment arm, and therefore, the torque exerted by the address electrodes is only slightly reduced.

The hidden hinge architecture is a two spacer process consisting of the hinge spacer and the beam spacer. The hinge spacer is a thin (~0.5 μm) layer. When it is removed, the resulting air gap allows the hinge to rotate freely. The beam spacer is thicker (~1.5 μm and determines the final angular rotation of beam 200. The thin hinge and thicker electrode are formed with a single plasma aluminum etch using the buried hinge process as discussed in above-identified U.S. Pat. No. 4,662,746.

The process sequence for the hidden hinge architecture is shown in FIGS. 7a–7d and consists of five layers (hinge spacer, hinge, electrode, beam spacer, and beam). This is to be compared with the conventional four layer process (electrode, spacer, hinge, beam).

Figure 7A:
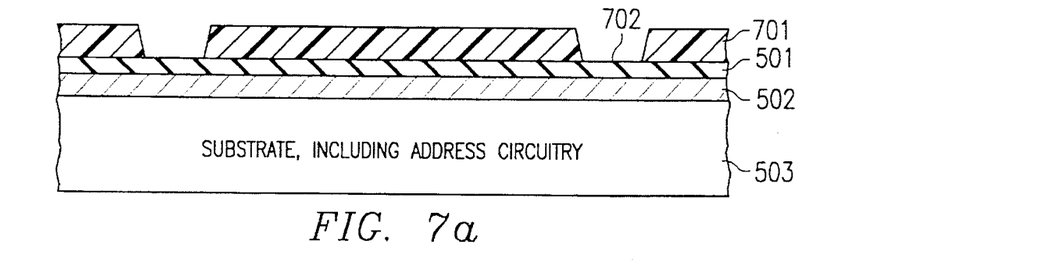
FIGS. 7a–7d show the steps in the process of manufacturing the multi-layered device.

The process begins with a completed address circuit 503 including contact openings formed in protective oxide 501 of the address circuit. The address circuit is typically a two metal layer/poly CMOS process. The contact openings allow access to the second level metal (METL2) 502 bond pads and to the METL2 address circuit output nodes.

Hinge spacer 701 is spin-deposited over the address circuit and patterned with holes 702 that will form the hinge support posts and electrode support posts and contacts. This spacer is typically 0.5 μm thick and is a positive photoresistant deep UV hardened to a temperature of 200° C. to prevent flow and bubbling during subsequent processing steps.

Figure 7B:
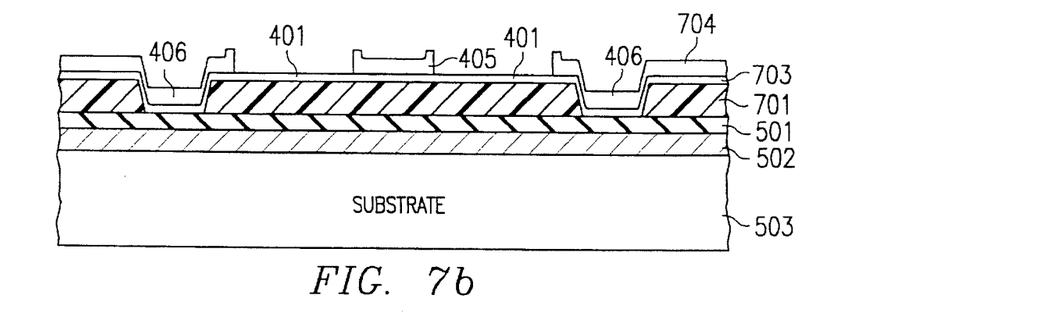

As shown in FIG. 7b, the next two layers 703 and 704 are formed by the so-called buried hinge process. An aluminum alloy that forms the hinge is sputter-deposited onto the hinge spacer. This alloy is typically 750 Angstroms thick and consists of 0.2% Ti, 1% Si and the remainder Al. A masking oxide is plasma-deposited and patterned in the shape of hinges 401. This hinge oxide is then buried by a second aluminum alloy layer 704 that is to form the electrode (typically 3000 Angstroms thick).

Next, a masking oxide is plasma-deposited and patterned in the shape of the electrodes 404, the electrode support posts 406 and the beam contact metal 405.

Finally, a single plasma aluminum etch is used to pattern the hinges, electrodes, support posts and beam contact metal. The electrode metal overlying the hinge region is etched away, exposing the buried-hinge oxide which acts as an etch stop. When the plasma aluminum etch is complete, regions of thin hinge metal 703 and thick electrode metal 704 have been simultaneously patterned. The masking oxide is then removed by a plasma etch.

Figure 7C:
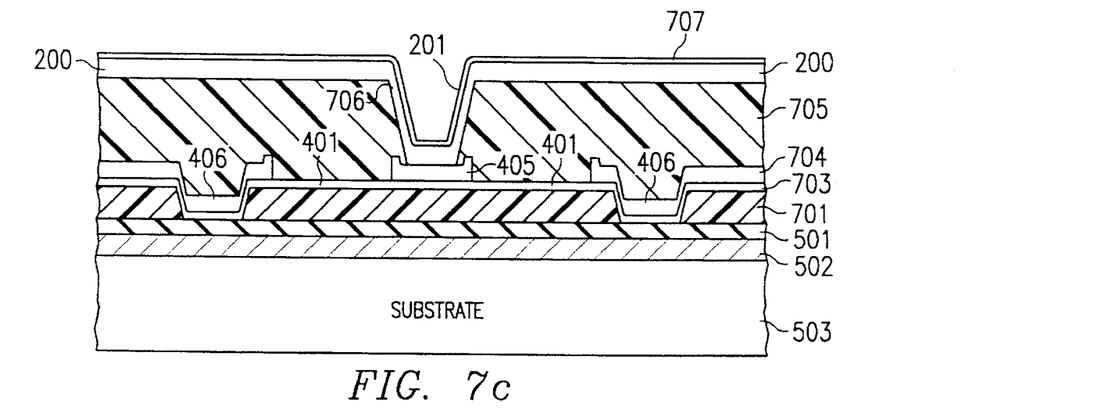

Next as shown in FIG. 7c, beam spacer 705 is spin-deposited over the hinges and electrodes and patterned with holes that will form beam support posts 201. Spacer 705 determines the torsion beam angular deflection and is typically 1.5 microns thick and is a positive photoresistant. It is deep UV hardened to a temperature of 180° C. to prevent flow and bubbling during subsequent processing steps. Note that no degradation of hinge spacer 701 occurs during this bake, because the hinge spacer was hardened to a higher temperature (200° C.).

Finally, an aluminum alloy that is to form beam 200 (typically 4000 Angstroms thick) is sputter-deposited onto beam spacer 705. Next, masking oxide 707 is plasma-deposited and patterned in the shape of the beams. The beam is then plasma etched to form the beams and beam support posts.

Figure 7D:
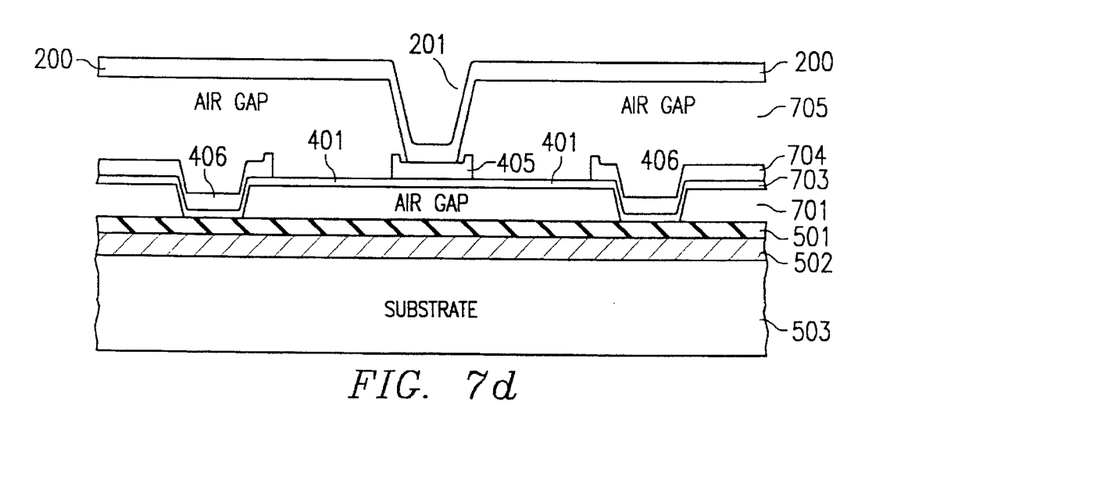
Figure 8A:
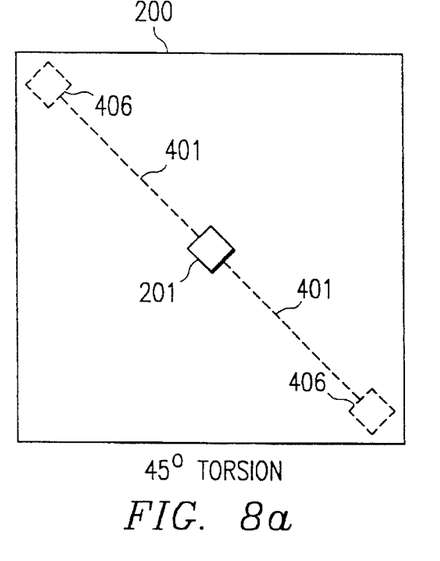
FIGS. 8a–8d show alternate physical configurations of the multi-layered device.
Figure 8B:
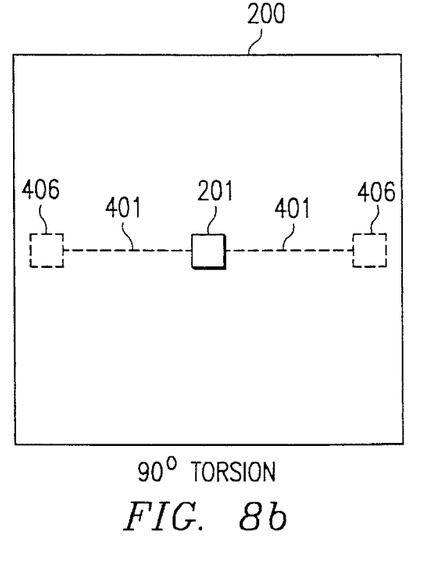
Figure 8C:
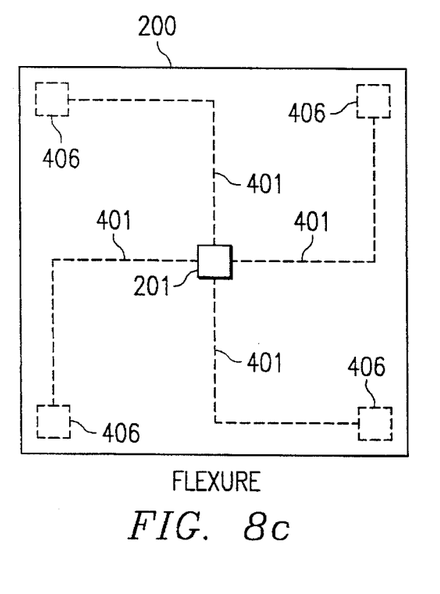
Figure 8D:
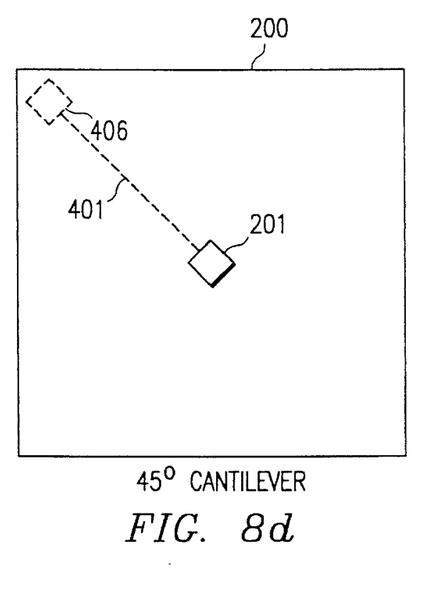

This completes the process at the wafer level. Masking oxide 707 on beam 200 is left in place. The wafers are then coated with PMMA, sawed into chip arrays and pulse spin-cleaned with chlorobenzene. Finally, the chips are placed in a plasma etching chamber, where masking oxide 707 is removed and both spacer layers 701 and 705 are completely removed to form the air gaps under the hinges and beams as shown in FIG. 7d.

Determination of the necessary amount of undercut to free the hinge is made by the use of modified dropout structures. Dropout structures were first disclosed in U.S. Pat. No. 4,566,935 which is hereby incorporated by reference herein. The modified dropout structure consists of the structure of FIG. 5a of this application, except the hinge is not connected to either hinge support post. When beam spacer 705 has been removed and a sufficient amount of hinge spacer 701 removed to free the hinge for rotation, beam 200 will drop to one side, with its edge resting on one of the electrodes. Alternately, correlation of the amount of hinge and electrode undercut can be made by using conventional dropout structures and removing the metal layers to observe the amount of residual spacer.

The hidden hinge architecture has several advantages, a few of which are obvious, and some, more subtle. First, as mentioned previously, by placing the hinges under the beam, the surface area occupied by the rotatable mirror is increased, leading to a greater modulation efficiency and hence a brighter display. Second, the hidden hinge is shielded from the projector light so it cannot scatter light into the pupil of the projection lens. Thus, the contrast ratio is increased. Third, for the same size pixel, the hidden hinge architecture allows torsion hinges to be made longer without reducing brightness and contrast, thus increasing the compliance and lowering the address voltage requirement.

Fourth, because the hinge spacer planarizes the underlying address circuit, no special planarization of the final address circuit metalization is required, (e.g. resist etch-back planarization of the protective oxide). Planarization of the underlying topography is necessary prior to the anisotropic hinge/electrode etch to prevent residual metal filaments in the electrode metal and to planarize the aluminum hillocks that have formed in METAL2.

Fifth, the landing electrodes are air isolated from the address circuit, thus reducing feed-through of the high-voltage reset pulse to the underlying address circuit. This coupling, if uncontrolled, can produce voltage spikes on the gates of the address transistors causing the transistors to momentarily turn on at the wrong time. Also, this air isolation minimizes the possibility of dielectric breakdown through the protective oxide.

Sixth, because the address electrodes are air isolated, they have reduced capacitance. It is therefore possible with the hidden hinge architecture to build a frame-addressed DMD (U.S. Pat. No. 4,615,595) where the address electrode rather than the beam is charge addressed. This would permit the fabrication of frame addressed torsion beam architectures without the need to electrically isolate the beams.

The hidden hinge has been illustrated for the 45 degree pixel architecture, but other pixel architectures are possible, as shown in FIGS. 8a–8d by changing the architecture of the hinge. When the hidden hinge is used for the flexure beam pixel, (FIG. 8c) beam support post 201 moves vertically through a distance of λ/4 (typically 1500 to 2000 Angstroms). The 5000 Angstrom hinge spacer air gap more than accommodates this vertical travel. The flexure beam pixel can be used as a phase-only modulator. The effect of hiding the hinges is to reduce the nonactive background which reduces the amplitude modulation component and makes the flexure beam closer to an ideal phase-only modulator.

Although this description describes the invention with reference to the above specified embodiments, the claims and not this description limited the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A spatial light modulation device said device comprising:

a base layer;

a beam layer;

a beam support post;

a hinge supported by said base layer and connected to said rotatable layer by said beam support post wherein said hinge allows said rotatable area to move within a defined motion with respect to said base layer, said hinge lying in a plane separate from the plane of said rotatable layer;

a hinge gap between said base layer and said hinge allowing for movement of said hinge; and a beam gap between said hinge and said beam layer allowing for movement of said beam layer.

2. The device set forth in claim 1 wherein said base layer includes discrete areas for providing signals for controlling said rotation of said rotatable layer.

3. The device set forth in claim 2 wherein said discrete areas include address electrodes.

4. The device set forth in claim 3 wherein said discrete areas further include address circuitry.

5. The device set forth in claim 2 further including a substrate layer containing control circuitry; and interconnection structure for communicating signals from said control circuitry to said discrete areas.

6. The device set forth in claim 5 wherein said control circuitry is constructed using CMOS technology.

7. The device set forth in claim 1, wherein said hinge gap is an air gap.

8. The device set forth in claim 1, wherein said beam gap is an air gap.

9. An array of pixels, each pixel individually rotatable into at least two states, said array comprising:

a base structure for supporting all of said pixels of said array, said array being maintained in a plane separate from the plane of said base;

each said pixel defining a surface area, each said pixel being connected to an end of a beam support post and an intermediate portion which is supported by said base structure and connected to each said pixel through an opposite end of said beam support post, said intermediate portion is separated from said base structure by a hinge gap and from each said pixel by a beam gap and positioned therebetween for connecting said base structure to each said pixel by allowing each said pixel to deform with respect to said base.

10. The device set forth in claim 9 further comprising a HDTV system and wherein said array is the visual display of a high density television receiver.

11. The device set forth in claim 9 wherein said base structure includes discrete areas for providing signals for controlling said rotation of said pixels.

12. The device set forth in claim 11 wherein said discrete areas include address electrodes.

13. The device set forth in claim 12 wherein said discrete areas further include address circuitry.

14. The device set forth in claim 12 further including a substrate layer containing control circuitry; and interconnection structure for communicating signals from said control circuitry to said discrete areas.

15. The device set forth in claim 14 wherein said control circuitry is constructed using CMOS technology.

16. The device set forth in claim 9 further comprising a display system wherein said array is a portion of a visual display of said system.

17. The device set forth in claim 9 further comprising a printer system wherein said array is a portion of an imaging system of said printer system.

18. The device set forth in claim 7, wherein said hinge gap is an air gap.

19. The device set forth in claim 7, wherein said beam gap is an air gap.

* * * * *